(12) United States Patent
Akita (10) Patent No.: US 7,239,803 B2
(45) Date of Patent: Jul. 3, 2007

(54) METHOD AND APPARATUS FOR DVD-VIDEO PLAYBACK AND AUTOMATIC DISC CHANGE CONTROL

(75) Inventor: Koji Akita, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 986 days.

(21) Appl. No.: 10/437,211

(22) Filed: May 13, 2003

(65) Prior Publication Data

US 2004/0018007 A1    Jan. 29, 2004

(30) Foreign Application Priority Data

May 20, 2002  (JP)  ............................ 2002-143950

(51) Int. Cl.
*H04N 5/00*   (2006.01)
*G11B 21/10*   (2006.01)

(52) U.S. Cl. .................................. 386/126; 369/30.06

(58) Field of Classification Search .................. 386/46, 386/56, 95, 111, 112, 121, 124–126; 369/47.12, 369/47.13, 53.21, 53.24, 30.05, 30.07, 30.19; 725/46, 89; 707/100–104; 710/102, 103, 710/301, 302

See application file for complete search history.

(56) References Cited

U.S. PATENT DOCUMENTS

| | | | | |
|---|---|---|---|---|
| 6,356,971 | B1 * | 3/2002 | Katz et al. .................. | 710/301 |
| 6,385,389 | B1 * | 5/2002 | Maruyama et al. ............ | 386/95 |
| 6,515,950 | B1 * | 2/2003 | Tanikawa et al. ......... | 369/53.24 |
| 2002/0024893 | A1 | 2/2002 | Hashimoto | |
| 2002/0100047 | A1 * | 7/2002 | Matoba et al. ................. | 725/46 |

FOREIGN PATENT DOCUMENTS

| | | |
|---|---|---|
| JP | 7-38265 | 4/1995 |
| JP | 10-112113 | 4/1998 |
| JP | 2000-156023 | 6/2000 |
| JP | 3172636 | 3/2001 |
| JP | 2001-195870 | 7/2001 |
| JP | 2002-074908 | 3/2002 |
| JP | 2002-124009 | 4/2002 |
| JP | 2002-245710 | 8/2002 |
| JP | 2002-143950 | 10/2002 |
| JP | 2002-352567 | 12/2002 |

OTHER PUBLICATIONS

Japanese Office Action Dated Apr. 18, 2006 with English translation.

* cited by examiner

*Primary Examiner*—Thai Q. Tran
*Assistant Examiner*—Mishawn Dunn
(74) *Attorney, Agent, or Firm*—Brinks Hofer Gilson & Lione (57) ABSTRACT

A DVD-video playback apparatus including a navigation manager that estimates the size of each title included in a DVD disc when the navigation manager receives a playback start command for the DVD disc from a main controller. The navigation manager sets titles whose sizes are larger than half of the size of the largest title as monitored titles, and starts playing back the DVD discs 1 by controlling a presentation engine. When the playback of all of the monitored titles is completed, the playback is stopped and a disc-change request is issued to the main controller. The main controller changes the DVD disc to another DVD disc by controlling a DVD changer, and issues a playback start command for the new DVD disc to the navigation manager.

21 Claims, 8 Drawing Sheets

|  | STORAGE | PLAYBACK STATUS |
|---|---|---|
| DISC 1 | PRESENT | FINISHED |
| DISC 2 | PRESENT | UNFINISHED |
| ⋮ | ⋮ | ⋮ |
| DISC n | ABSENT |  |

FIG. 6B

| TTN | PLAYBACK STATUS |
|---|---|
| TTN = 1 | FINISHED |
| TTN = 3 | UNFINISHED |
| ⋮ | ⋮ |
| TTN = i | UNFINISHED |

FIG. 6C

| TTN = 1 |
|---|
| TTN = 2 |
| ⋮ |
| TTN = i |

FIG. 6D

| PVR_ID | POS_CD |
|---|---|
| TTN = 1 ||
| TTN = 2 ||
| ⋮ ||
| TTN = i ||

METHOD AND APPARATUS FOR DVD-VIDEO PLAYBACK AND AUTOMATIC DISC CHANGE CONTROL

BACKGROUND

1. Field of the Invention

The present invention relates to a technique for automatically changing a digital video disc (DVD) for play back in a DVD-video playback apparatus that stores a plurality of DVD discs and has a disc-change function for selectively playing back one of the DVD discs.

2. Description of the Related Art

CD changers that store a plurality of CD digital audio (CD-DA) discs on which audio presentations (music, etc.) are recorded as tracks and sequentially play back the tracks recorded on each CD-DA disc are known in the art. In a typical CD changer, automatic disc changing is performed by successively playing back the tracks recorded on each CD-DA disc from the first track to the last track. When the playback of the last track of one of the CD-DA discs is completed, it is determined that the playback of this CD-DA disc is completed, and this CD-DA disc is changed for the next CD-DA disc.

On the other hand, DVD discs are commonly used for recording video presentations. In DVD discs, video presentations are generally recorded as titles. In addition, unlike CD-DA discs where a default playback order of the audio presentations is defined by the order in which the tracks are recorded, providers of DVD discs can arbitrarily set the playback sequence of the titles. Therefore, the order in which the titles are recorded and title numbers which are assigned to the titles do not always correspond to the playback order of the titles. In addition, a playback sequence where a title is repeatedly and endlessly played back or a playback sequence where the title to be played back next is determined by an operation performed by a user every time the playback of a title is completed may also be used. Accordingly, in such cases, the last title, which corresponds to the last track in CD-DA discs, is not defined in DVD discs.

Accordingly, the above-described automatic disc change technique for CD changers, in which it is determined that the playback of a CD-DA disc is completed when the playback of the last track is completed and this CD-DA disc is changed for the next CD-DA disc, cannot be applied to DVD discs by simply replacing tracks with titles. In known DVD-video playback apparatuses which store a plurality of DVD discs and which have a disc-change function for selectively playing back one of the DVD discs, automatic disc changing for automatically changing the DVD disc to be played back cannot be performed. More specifically, when a plurality of DVD discs are used, the user must determine whether or not to change the DVD disc to be played back and perform an operation for changing the DVD disc.

BRIEF SUMMARY

An object of the present invention is to provide a DVD-video playback apparatus that stores a plurality of DVD discs, which has a disc-change function for selectively playing back one of the DVD discs, and which also has an automatic disc changing function for changing the DVD disc to be played back while reliably playing back titles of interest to the user.

In order to attain the above-described object, according to a preferred embodiment of the present invention, a DVD-video playback apparatus that stores a plurality of DVD discs and selectively plays back one of the DVD discs includes a disc-change unit which changes a playback-target DVD disc among the plurality of DVD discs; a monitored-title setting unit that selects one or more titles from among titles recorded on the playback-target DVD disc in accordance with the size of each title and sets the selected one or more titles as one or more monitored titles; a playback unit which plays back the titles recorded on the playback-target DVD disc in accordance with navigation data recorded on the playback-target DVD disc; and a disc-change controller which commands the playback unit to stop playing back the playback-target DVD disc and commands the disc-change unit to change the playback-target DVD disc when playback of the one or more monitored titles is completed.

As described above, in the DVD-video playback apparatus according to the present invention, it is determined that the playback of a DVD disc is completed when the playback of titles selected from among the titles recorded on the DVD disc in accordance with the sizes thereof is completed, and automatic disc changing is performed for changing the playback-target DVD disc. Among the titles recorded on a DVD disc, titles of interest to the user, that is, titles which the user wishes to view, can be estimated on the basis of the size of each title. Therefore, according to a preferred embodiment of the present invention, the titles of interest to the user which are recorded on the DVD disc are reliably played back, and the playback-target DVD disc can be changed when all of the titles of interest are played back.

For example, the monitored-title setting unit may select the largest title among the titles recorded on the playback-target DVD disc as the monitored title. In such a case, when, for example, a title such as a movie is recorded on the DVD disc along with other titles such as commercials, the DVD disc can be changed immediately after the playback of the movie, which can be generally assumed to be the title of interest to the user, is completed. In addition, the monitored-title setting unit may also select one or more titles whose sizes are larger than a predetermined size or one or more titles whose sizes are larger than the product of the size of the largest title among the titles recorded on the playback-target DVD disc and a predetermined rate, as the one or more monitored titles. In such a case, when, for example, a plurality of music clips are recorded on the DVD disc along with other small titles such as commercials, the DVD disc can be changed immediately after the playback of the music clips or the short films, which can be generally assumed to be the titles of interest to the user, is completed.

In the above-described DVD-video playback apparatus, the monitored-title setting unit may estimate the size of each title on the basis of a playback time indicated by a program-chain playback time (PGC_PB_TM) included in video-title-set program-chain information (VTS_PGCI) of the corresponding title or the number of programs or cells indicated by a program-chain content (PGC_CNT) included in video-title-set program-chain information (VTS_PGCI) of the corresponding title.

In addition, according to another preferred embodiment of the present invention, in order to attain the above-described object, a DVD-video playback apparatus that stores a plurality of DVD discs and selectively plays back one of the DVD discs includes a memory that stores monitor specification information specifying the relationship between identification information of each DVD disc and one or more titles selected from among titles recorded on the DVD disc, the selected one or more titles being monitored during playback of the DVD disc; a disc-change unit that changes a playback-target DVD disc among the plurality of DVD discs; a monitored-title setting unit which sets the one or more titles corresponding to the identification information of the playback-target DVD disc specified by the monitor specification information as one or more monitored titles; a playback unit that plays back the titles recorded on the playback-target DVD disc in accordance with navigation data recorded on the playback-target DVD disc; and a disc-change controller that commands the playback unit to stop playing back the playback-target DVD disc and commands the disc-change unit to change the playback-target DVD disc when playback of the one or more monitored titles is completed.

In the above-described DVD-video playback apparatus, the titles which are to be played back before the playback-target DVD disc is changed for another DVD disc can be set as the monitor specification information for each of the DVD discs.

By setting the titles which the user wishes to view, or the titles which can be assumed that the user would wish to view, in the monitor specification information, the playback-target DVD disc can be changed immediately after the playback of the titles of interest to the user is completed.

More specifically, a further embodiment of the above-described DVD-video playback apparatus may be constructed to further include a user request receiving unit that receives a DVD disc change request issued by a user; a playback history manager that manages a playback history of the titles recorded on the playback-target DVD disc from the selection of the corresponding DVD disc as the playback-target DVD disc until the current time; and a monitor-specification-information setting unit that, when the user request receiving unit receives the DVD disc change request, updates the monitor specification information so the identification information of the playback-target DVD disc corresponds to one or more titles which have already been played back according to the playback history, and the disc-change controller commands the playback unit to stop playing back the playback-target DVD disc and commands the disc-change unit to change the playback-target DVD disc when playback of the one or more monitored titles is completed or when the user request receiving unit receives the DVD disc change request.

When the user issues a disc change request to change the playback-target DVD disc to another DVD disc, the titles that have been played back before the issuance of the disc change request are memorized, and this DVD disc is automatically changed afterwards when the playback of these titles is completed. If the user issues the disc change request to change the playback-target DVD disc to another DVD disc while the playback-target DVD disc is still being played back, it can be assumed that the playback of the titles of interest to the user is already completed. Therefore, the titles of interest to the user which are recorded on the DVD disc are reliably played back, and the playback-target DVD disc can be changed when all of the titles of interest to the user are played back.

The above-described automatic disc changing in the DVD-video playback apparatus may also be applied to a presentation playback apparatus which stores a plurality of recording discs, each recording disc storing one or more presentations and playback control information for controlling a playback sequence of the one or more presentations, and which selectively plays back one of the recording discs by replacing the DVD discs with recording discs and the titles with presentations.

As described above, a DVD-video playback apparatus that stores a plurality of DVD discs, that has a disc-change function for selectively playing back one of the DVD discs, and that also has an automatic disc changing function for changing the DVD disc to be played back while reliably playing back titles of interest to the user is provided.

DETAILED DESCRIPTION OF THE DRAWINGS AND THE PRESENTLY PREFERRED EMBODIMENTS

Figure 1:
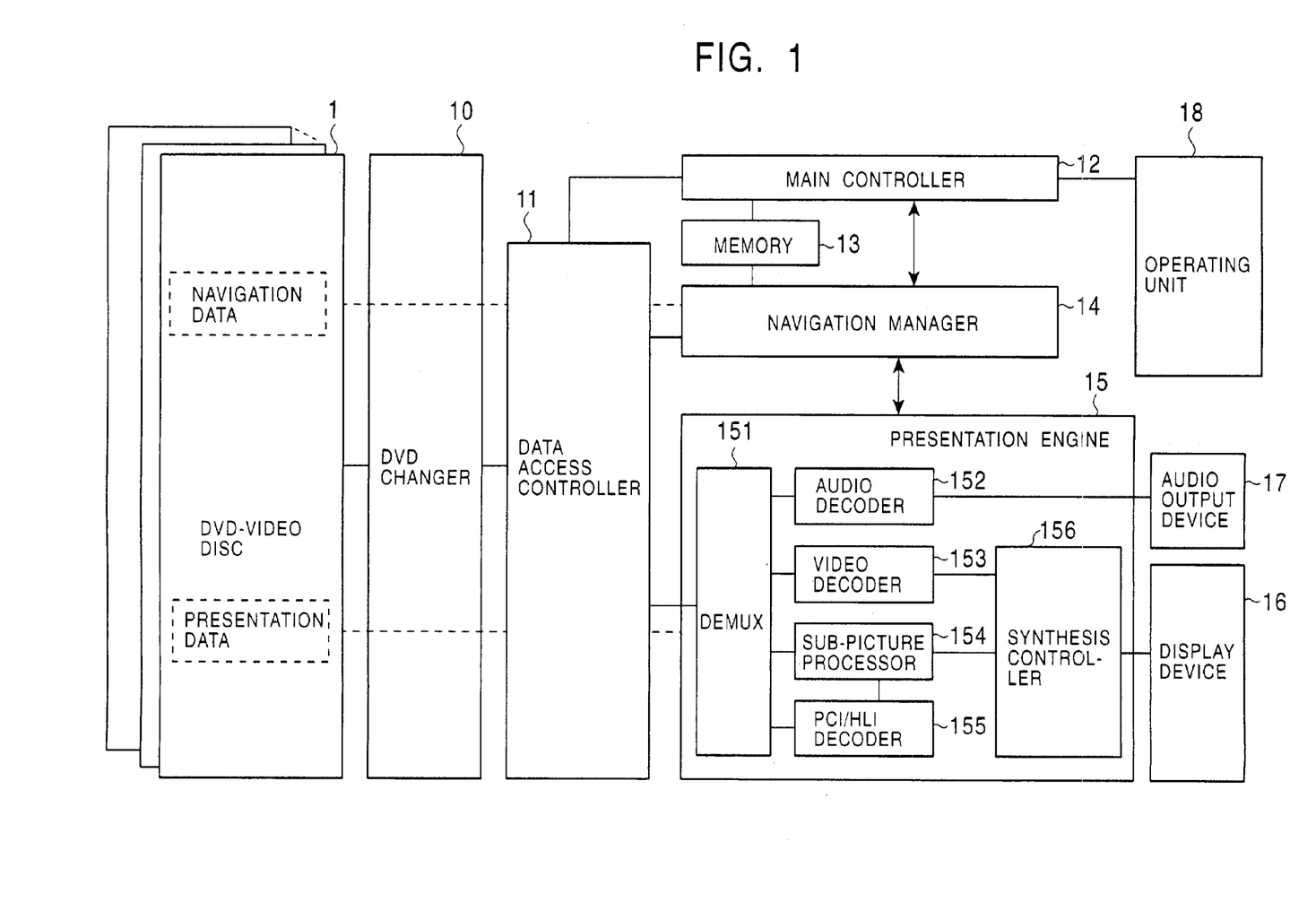
FIG. 1 is a block diagram block diagram showing the construction of a DVD-video playback apparatus according to an embodiment of the present invention.

FIG. 1 depicts a DVD-video playback apparatus according to an embodiment of the present invention.

As shown in FIG. 1, the DVD-video playback apparatus includes a DVD changer 10 which stores a plurality of DVD discs 1, selectively loads one of the DVD discs 1 from among the plurality of DVD discs 1, and plays back data recorded on the loaded DVD disc 1. In addition, the DVD-video playback apparatus also includes a data access controller 11 which accesses the data recorded on the DVD disc 1 via the DVD changer 10, a main controller 12, a nonvolatile memory 13, a navigation manager 14, a presentation engine 15, a display device 16, an audio output device 17 such as a speaker, and an operating unit 18 such as a remote controller.

Each DVD disc 1 has a read-in area, a read-out area, and a data area positioned therebetween which comply with the DVD-ROM format (physical format). The data area includes a volume/file structure area in which the volume/file structure is specified in accordance with the UDF-Bridge format (file format). In addition, a file group consisting of a plurality of files is stored in the data area, and data included in this file group serves as application data which complies with the DVD format. The application data can be broadly divided into presentation data which includes the actual details of presentations such as audio data, video data, sub-picture data, and highlight information, and navigation data which is used for controlling the playback of the presentation data.

The presentation engine 15 includes a demultiplexer unit 151 which reads out the presentation data from the DVD disc 1 via the data access controller 11 and the DVD changer 10 and extracts the audio data, the video data, the sub-picture data, the highlight information, etc., from the presentation data; an audio decoder 152 that decodes the extracted audio data and outputs the decoded data to an audio switch unit as a playback sound, a video decoder 153 that decodes the extracted video data; a PCI/HLI decoder 155 that decodes highlight information (HLI); a sub-picture processor 154 that generates a sub-picture by using the highlight information (HLI) as necessary; and a synthesis controller 156 that synthesizes the decoded video image and the generated sub-picture and outputs the synthesized image to a window controller as a playback image.

The navigation manager 14 reads out the navigation data via the data access controller 11 and the DVD changer 10, determines a playback sequence for playing back the presentations in the presentation engine 15 on the basis of the navigation data and a user command obtained from the operating unit 18, and controls the playback operation in the presentation engine 15 in accordance with the determined playback sequence.

The main controller 12 performs an automatic disc change process and changes the DVD disc 1 to be played back in accordance with the playback status of tracks in the navigation manager 14.

Figure 2:
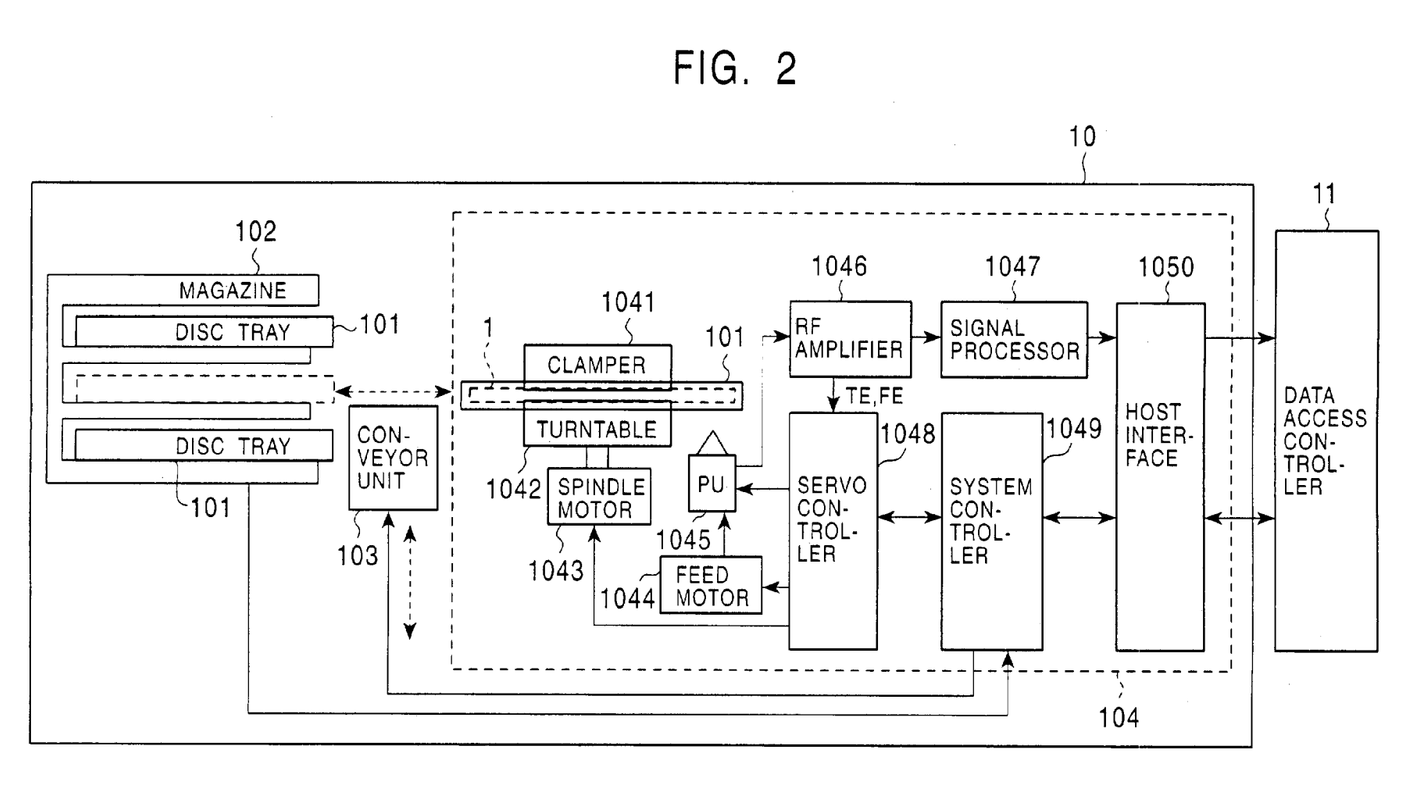
FIG. 2 is a block diagram showing the construction of a DVD changer according to the embodiment of the present invention.

FIG. 2 is a diagram showing the construction of the DVD changer 10. As shown in the figure, the DVD changer 10 includes a magazine 102 that stores a plurality of disc trays 101 each of which holds a single DVD disc 1; a data playback unit 104 that plays back the data recorded on the DVD discs 1, and a conveyor unit 103 that moves vertically with respect to the magazine 102 and conveys the disc tray 101 holding an arbitrary DVD disc 1 between the playback unit 104 and the magazine 102. The data playback unit 104 includes a clamper 1041, a turntable 1042, a spindle motor 1043, a feed motor 1044, a pickup 1045, an RF amplifier 1046, a signal processor 1047, a servo controller 1048, a system controller 1049, and a host interface 1050.

The conveyor unit 103 conveys one of the disc trays 101 in the magazine 102 which is placed at a storage position specified by the system controller 1049 to a position between the clamper 1041 and the turntable 1042. Then, the clamper 1041 and the turntable 1042 clamps the DVD disc 1 held by the disc tray 101 through an opening formed in the disc tray 101. The above-described operation of conveying the disc tray 101 stored in the magazine 102 and clamping the DVD disc 1 held by the disc tray 101 is called "loading".

Next, the pickup 1045 reads out signals recorded on the DVD disc 1 clamped in the disc tray 101 through the opening formed in the disc tray 101. The conveyor unit 103 also conveys (stores) the disc tray 101 from the position between the clamper 1041 and the turntable 1042 to the corresponding position in the magazine 102.

The pickup 1045 includes a laser source; an objective lens which converges light emitted from the laser source and guides the light reflected by a signal-recorded surface of the DVD disc 1 toward a photoelectric element; a focus actuator which adjusts a focal position by moving the objective lens in the direction perpendicular to the signal-recorded surface of the DVD disc 1; and a tracking actuator which performs tracking adjustment by moving the objective lens in the radial direction of the DVD disc 1.

The feed motor 1044 performs a seek operation in which the pickup 1045 is moved in the radial direction of the DVD disc 1, and the spindle motor 1043 rotates the DVD disc 1 which is clamped between the turntable 1042 and the clamper 1041. The RF amplifier 1046 generates an RF signal by amplifying a signal output from the pickup 1045 and performing a predetermined equalizer process, and outputs the generated RF signal. In addition, the RF amplifier 1046 also generates a focus error (FE) signal necessary for focus servo control and a tracking error (TE) signal necessary for tracking servo control. The servo controller 1048 controls the seek operation performed by the feed motor 1044 under the control of the system controller 1049, and performs various servo control processes in accordance with the focus error (FE) signal and the tracking error (TE) signal. For example, the servo controller 1048 controls the laser source and performs the focus servo control and the tracking servo control by transmitting commands to the pickup 1045, and also performs servo control of the rotation of the spindle motor 1043 by transmitting commands to the spindle motor 1043. In addition, the signal processor 1047 plays back the data recorded on the DVD disc 1 by using the RF signal input from the RF amplifier 1046, and outputs the obtained data to the host interface 1050.

The magazine 102 includes switches which indicate the presence/absence of the disc trays 101 at disc-tray storage positions, and informs the system controller 1049 of the presence/absence of the disc tray 101 at each of the disc-tray storage positions in the magazine 102. The system controller 1049 controls each of the above-described units and performs a read process in which designated data recorded on a designated DVD disc 1 is played back and is output to the data access controller 11 via the host interface 1050 in accordance with a playback request transmitted from the data access controller 11 via the host interface 1050. In addition, the system controller 1049 also performs a disc-change process in which the clamper 1041 and the conveyor unit 103 are controlled so as to change the DVD disc 1 which is loaded in the playback unit 104 in a state such that the data recorded on the DVD disc 1 can be played back by the playback unit 104 in accordance with a loading control request transmitted from the data access controller 11 via the host interface 1050, and a process of reporting the storage status of the disc trays 101, etc., in accordance with a request transmitted from the data access controller 11 via the host interface 1050.

There are three kinds of presentations used in the DVD format: a menu presentation for all of the titles; menu presentations which each is common for a plurality of titles; and presentations for individual titles. A playback sequence for each presentation is defined by one or more program chains (PGCs), and the construction of each PGC is defined by program chain information (PGCI).

Figure 3:
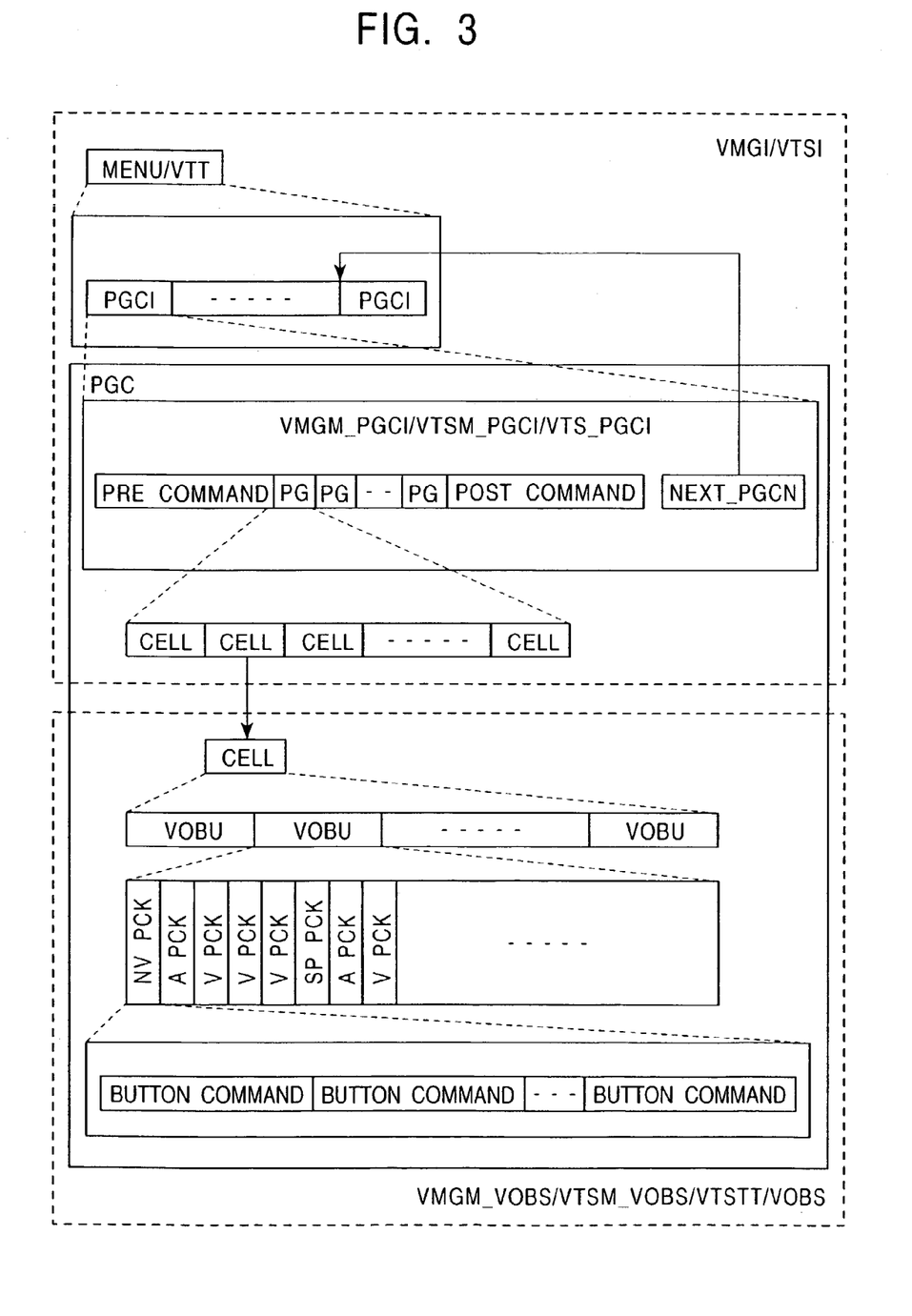
FIG. 3 is a diagram showing a playback structure which complies with the DVD format.

FIG. 3 is a diagram showing the playback structure of the PGCs, and the playback order of programs (PG) included in each PGC is defined by the PGCI. The PGCI may include PRE_COMMAND, which is a command to be executed when the playback of the corresponding PGC starts, POST_COMMAND, which is a command to be executed when the playback of the corresponding PGC is completed, and NEXT_PGCN, which indicates the PGC which is to be played back next.

Each program (PG) includes one or more cells (CELL) which each includes a plurality of video object units (VOBU), and each VOBU may include a plurality of video packs (V_PCK), audio-packs (A_PCK), and sub-picture packs (SP_PCK) in addition to a single navigation pack (NV_PCK). The video packs (V_PCK) store video data, the audio packs (A_PCK) store audio data, and the sub-picture packs (SP_PCK) store sub-picture data.

Accordingly, the playback structure of each PGC is defined by the PGCI as described above. In addition, FIG. 4 shows a data structure of the application data which complies with the DVD format.

Figure 4:
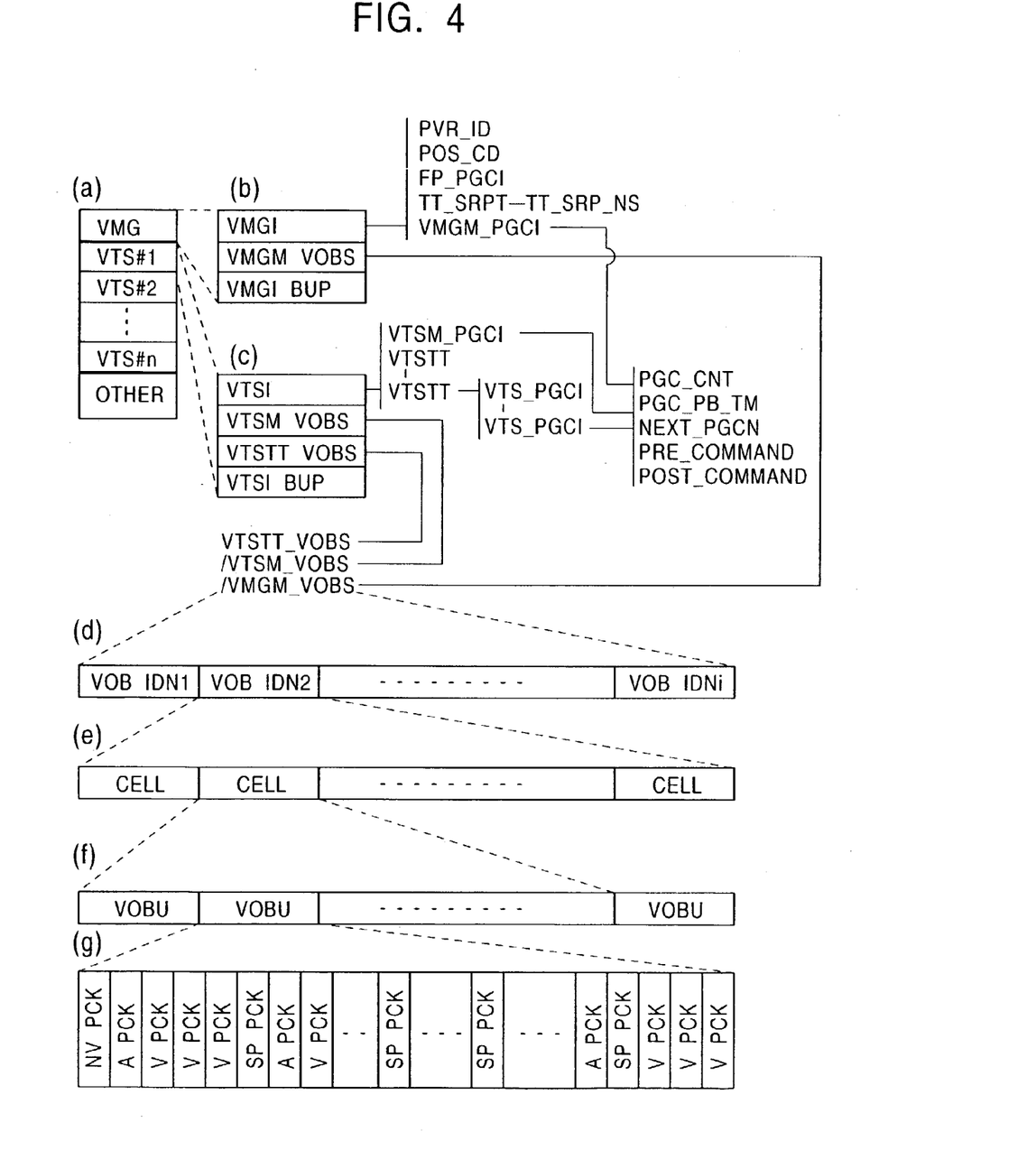
FIG. 4 is a diagram showing a data structure which complies with the DVD format.

As shown in FIG. 4, the application data which complies with the DVD format includes a video manager (VMG) which is the data of a menu for all of the titles and one or more video title sets (VTS), each of which is the data of one or more titles (see (a) in FIG. 4).

VMG includes video manager information (VMGI) and a video object set for a video manager menu (VMGM_VOBS). VMGI includes a provider identifier (PVR_ID) which is unique to the provider of the DVD disc 1, a POS code (POS_CD) of the DVD disc 1, a title search pointer (TT_SRPT), a description of the PGC which is to be played back first when the playback of the DVD disc 1 is started (FP_PGCI), and PGCI for controlling the playback of the menu presentation for all of the titles by using VMGM_VOBS (VMGM_PGCI) (see (b) in FIG. 4). In addition, the title-search pointer (TT_SRPT) includes a title-search pointer number (TT_SRPT_NS) which indicates the number of titles recorded on the DVD disc 1.

In addition, each VTS includes video title set information (VTSI), a video object set for a video title set menu (VTSM_VOBS), and a video object set for a video title set title (VTSTT_VOBS). VTSI includes PGCI for controlling the playback of the menu presentation which is common for the titles included in VTS by using VTSM_VOBS (VTSM_PGCI), and PGCI for controlling the playback of the presentation of each title by using VTSTT_VOBS (VTS_PGCI) (see (c) in FIG. 4). In addition, VTSI also includes descriptions regarding the title to which VTS_PGCI corresponds and VTS_PGCI which is to be played back first (entry PGC) when the playback of the title is started.

Each of VMGM_PGCI, VTSM_PGCI, and VTS_PGCI includes PGC_CNT which indicates the number of programs (PG) or cells included in the corresponding PGC, PGC_PB_TM which indicates the playback time of the PGC, NEXT_PGCN which indicates the PGC which is to be played back next when the playback of the corresponding PGC is completed, and the above-described PRE_COMMAND and POST_COMMAND.

In addition, each of VMGM_VOBS, VTSM_VOBS, and VTSTT_VOBS includes one or more video objects (VOB) (see (d) in FIG. 4), and each VOB includes one or more cells (CELL) (see (e) in FIG. 4). As described above, each CELL includes one or more video object units (VOBU) (see (f) in FIG. 4), and each VOBU includes a plurality of video packs (V_PCK), audio packs (A_PCK), and sub-picture packs (SP_PCK) in addition to a single navigation pack (NV_PCK) (see (g) in FIG. 4).

PCI, DSI, VMGI, and VTSI correspond to the above-described navigation data, and various packs in each VOBU excluding NV_PCK correspond to the above-described presentation data. In FIG. 3, the block formed by dashed lines show the playback structure of the presentations and the relationship between PGCI and VOBS.

Figure 5:
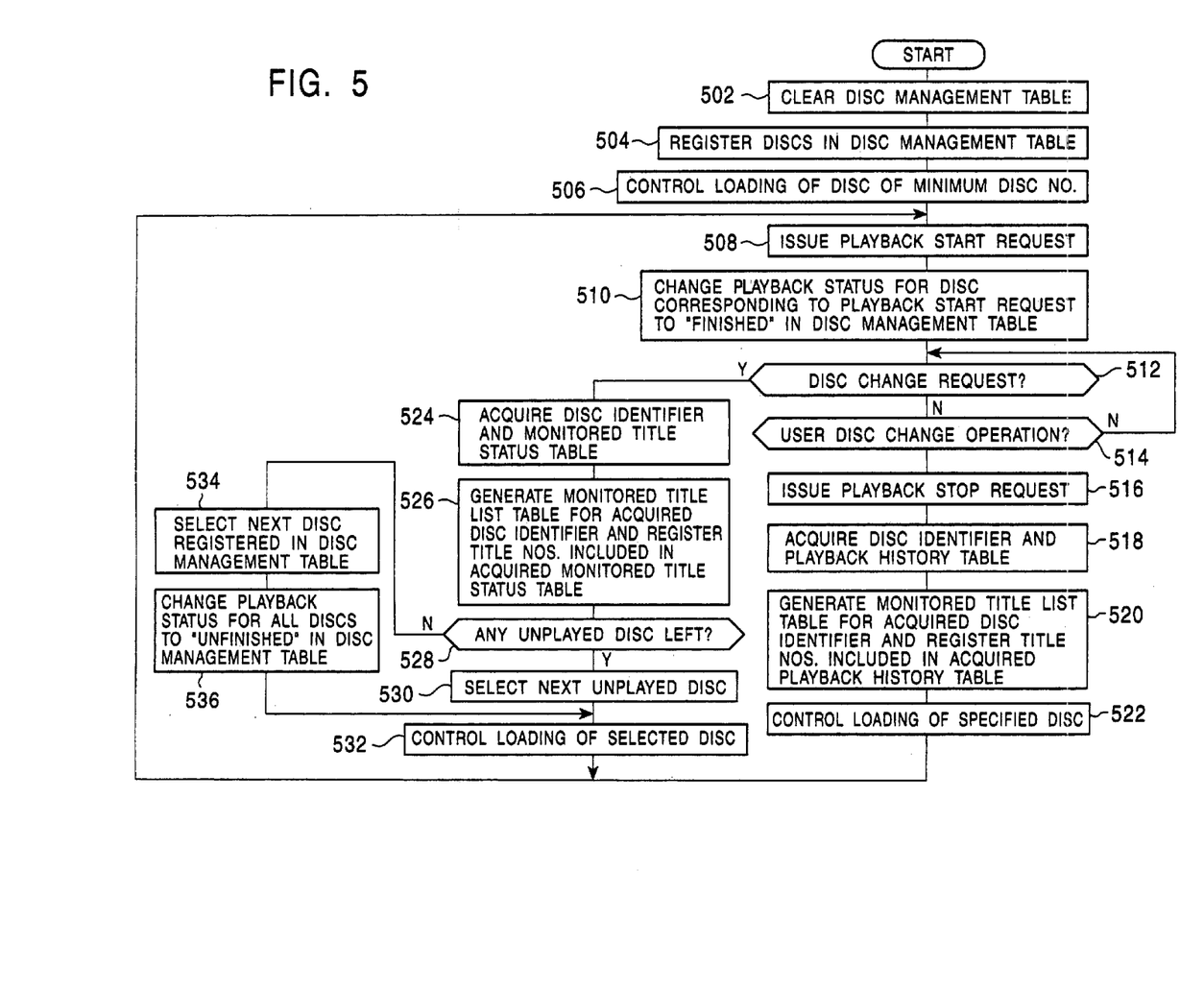
FIG. 5 is a flowchart showing an automatic disc change process performed in the DVD-video playback apparatus according to an embodiment of the present invention.

FIG. 5 is a flowchart shows the automatic disc change process performed by the main controller 12.

As shown in the figure, when the process starts, the main controller 12 clears a disc management table (act 502).

Figure 6A:
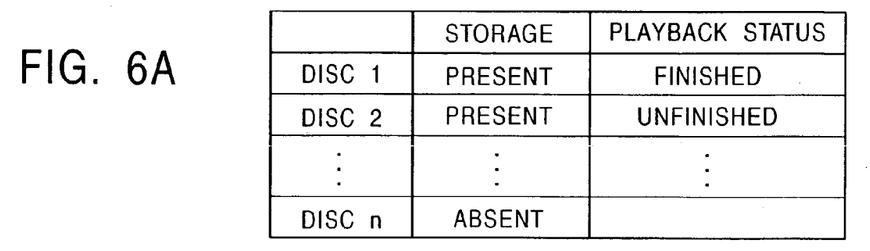
FIGS. 6A, 6B, 6C, and 6D are a disc management table, a monitored-title status table, a playback history table, and a monitored-title list table, respectively, which are stored in the DVD-video playback apparatus according to an embodiment of the present invention.

A disc number is assigned to each of the disc-tray storage positions in the magazine 102, and each of the DVD discs 1 held by the disc trays 101 stored in the magazine 102 is identified by the disc number of the disc-tray storage position at which the corresponding disc tray 101 is placed. As shown in FIG. 6A, the disc management table includes the storage status, that is, the presence/absence of the disc tray 101 at each of the disc-tray storage positions corresponding to the disc numbers, and the playback status (finished/unfinished) of the DVD disc 1 held by the disc tray 101 at each of the storage positions in the magazine 102.

The main controller 12 receives a report on the storage status of the disc tray 10 at each of the disc-tray storage positions in the magazine 102 from the DVD changer 10 via the data access controller 11, and registers the presence/absence of the disc tray 101 at each of the disc-tray storage positions in the magazine 102 into the disc management table (act 504).

Next, the main controller 12 issues a command to load the disc tray 101 corresponding to the smallest disc number among the disc trays 101 which are stored in the magazine 102 and registered in the disc management table to the DVD changer 10 via the data access controller 11 (act 506). When the loading of the disc tray 101 is completed, the main controller 12 issues a new disc playback start request to the navigation manager 14 (act 508), and changes the playback status of the DVD disc 1 held by the loaded disc tray 101 to "finished" in the disc management table (act 510).

Figure 7:
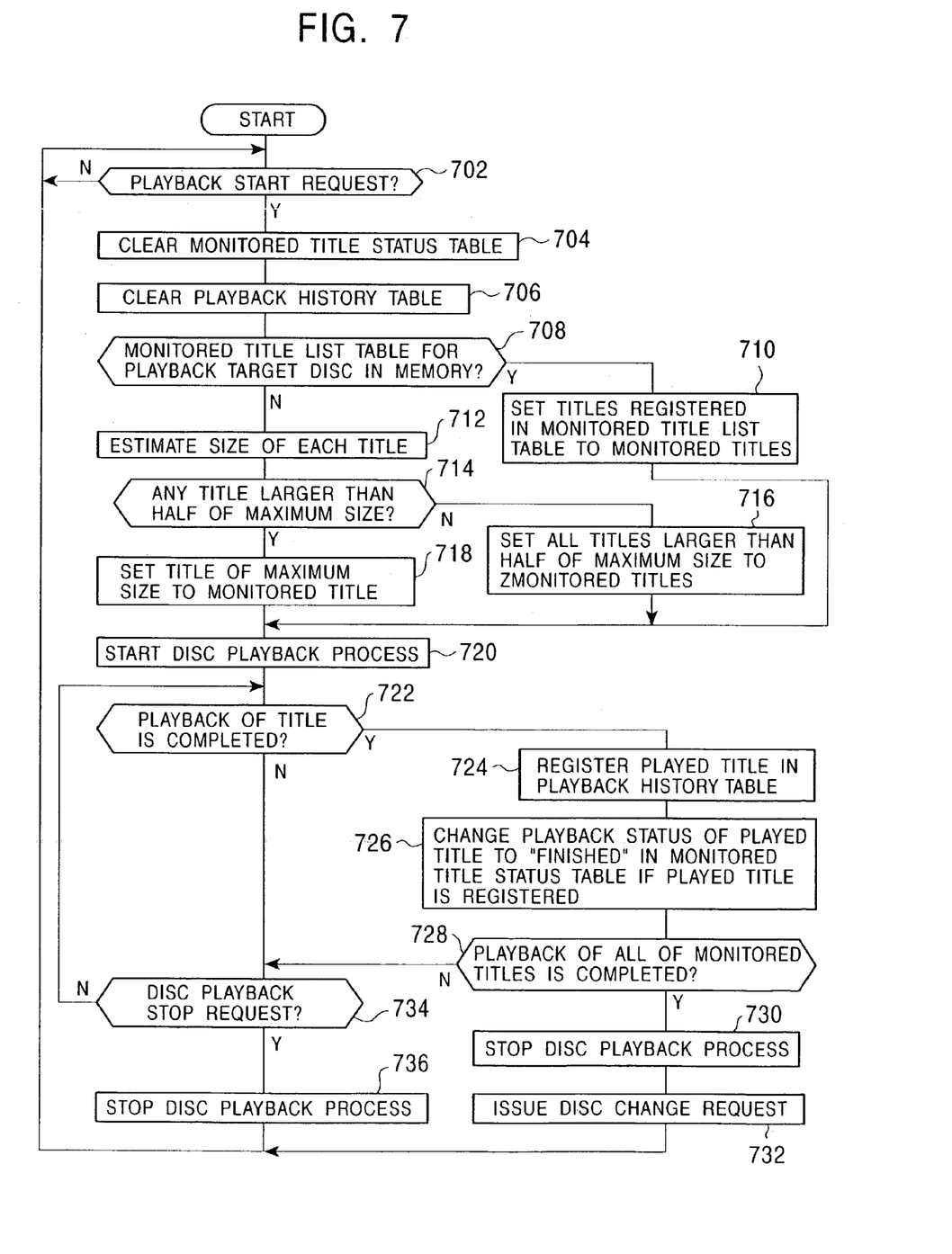
FIG. 7 is a flowchart showing a disc playback control process performed in the DVD-video playback apparatus according to an embodiment of the present invention.

When the navigation manager 14 receives the new disc playback start request, it performs a disc playback control process shown in FIG. 7.

Figure 6B:
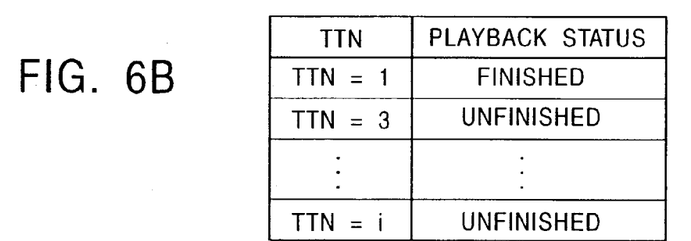
Figure 6C:
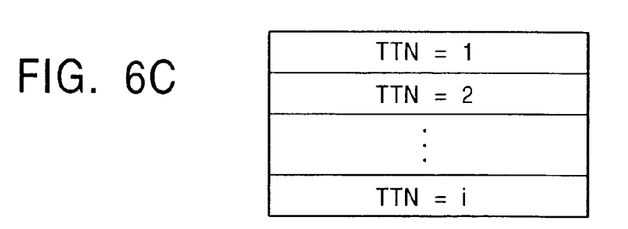

More specifically, when the navigation manager 14 receives the new disc playback start request (act 702), it clears a monitored-title status table (act 704), and then clears a playback history table (act 706). As shown in FIG. 6B, the monitored-title status table includes one or more title numbers (TTN) of one or more titles which are to be monitored (hereinafter referred to as monitored titles) among the titles included in the DVD disc 1 which is currently selected to be played back (hereinafter referred to as a current playback-target DVD disc 1) and the playback status (finished/unfinished) of each of the monitored titles. Among the titles recorded on the DVD disc 1, titles which are necessarily played back before the DVD disc 1 is automatically changed to another DVD disc 1 are registered as the monitored titles by a process which will be described below. In addition, as shown in FIG. 6C, the playback history table includes title numbers (TTN) of titles which have been played back during the time since the DVD disc 1 was selected as the playback-target until the current time.

Then, the navigation manager 14 reads out the information such as VMGI and VTSI from the current playback-target DVD disc 1 via the data access controller 11, and performs the following process.

Figure 6D:
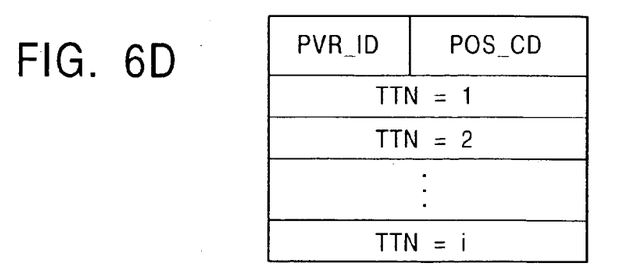

First, the navigation manager 14 determines whether or not a monitored title list table for the current playback-target DVD disc 1 is registered in the memory 13 (act 708). As shown in FIG. 6D, the monitored-title list table includes an identifier of a DVD disc 1 and one or more title numbers (TTN) of one or more titles which are to be monitored when the DVD disc 1 having that identifier is played back. The identifier of the DVD disc 1 may be, for example, the combination of the number of titles and the number of programs recorded on the DVD disc 1 or the combination of the number of titles recorded on the DVD disc 1 and the number of programs included in each title. The number of titles recorded on the DVD disc 1 may be indicated by TT_SRP_NS included in TT_SRPT of VMGI. In addition, the number of programs included in each title can be obtained by PGC_CNT of the PGCs included the corresponding title.

In addition, when, for example, effective PVR_ID and POS_CD are included in VMGI of the DVD disc 1, the combination of PVR_ID and POS_CD may also be used as the identifier of the DVD disc 1. In addition, when effective information with which the DVD disc 1 can be identified, such as an administration and an additional administration of IT_TXT, is included in VMGI of the DVD disc 1, such information may also be used as the identifier of the DVD disc 1.

The above-described combination of the number of titles and the number of programs recorded on the DVD disc 1 and the combination of PVR_ID and POS_CD may also be used in combination for identifying the DVD disc 1. For example, the combination of PVR_ID and POS_CD may be used as the identifier of the DVD disc 1 when effective PVR_ID and POS_CD are included in VMGI of the DVD disc 1, and the combination of the number of titles and the number of programs recorded on the DVD disc 1 may be used when effective PVR_ID and POS_CD are not included in VMGI of the DVD disc 1.

When the monitored-title list table for the current playback-target DVD disc 1 is registered in the memory 13, one or more title numbers (TTN) included in the monitored-title list table are registered in the monitored-title status table (act 710), and the process proceeds to act 720.

When the monitored-title list table for the current playback-target DVD disc 1 is not registered in the memory 13 the size of each title recorded on the current playback-target DVD disc 1 is estimated (act 712). The size of each title is estimated as the sum of playback times indicated by PGC_PB_TM of the PGCs included in each title or the sum of the number of programs or cells indicated by PGC_CNT of the PGCs included in each title.

Then, a title corresponding to a maximum estimated size is determined, and it is determined whether or not there is any title whose size is larger than half of the maximum size (act 714). If there is no title whose size is larger than half of the maximum size, only the title number (TTN) of the title corresponding to the maximum size is registered in the monitored-title list table (act 718), and the process proceeds to act 720. If there are one or more titles whose sizes are larger than half of the maximum size, the title numbers (TTN) of all of the titles whose sizes are larger than half of the maximum size, including the title having the maximum estimates size, are registered in the monitored-title list table (act 716), and the process proceeds to act 720.

In act 720, the playback process of the current playback-target DVD disc 1 is started. In the playback process, the playback of the PGCs are started from FP_PGCI in accordance with the above-described playback structure and the data structure.

In the disc playback control process, in parallel to the above-described playback process, the navigation manager 14 also waits for the completion of the playback of a title (act 722) or a playback stop request issued by the main controller 12 (act 734). When the PGCI which is being played back is changed from PGCI which belongs to a certain title to PGCI which belongs to another title, it is determined that the playback of this title is completed.

When the playback of a title is completed, the title number of this title is registered in the title playback history table (act 724). In addition, if the title number of this title is registered in the monitored-title status table, the playback status for the title number of this title is changed to "finished" in the monitored-title status table (act 726). Then, it is determined whether the playback statuses for all of the title numbers registered in the monitored-title status table are changed to "finished" (act 728). If the playback statuses for all of the title numbers registered in the monitored-title status table are changed to "finished", the playback process is stopped (act 730) and a disc change request is issued to the main controller 12 (act 732). Then, the process returns to act 702 and waits for the next new disc playback start request.

When the playback stop request is issued by the main controller 12, the playback process is stopped (act 736), and the process returns to act 702 and waits for the next new disc playback start request.

With reference to the automatic disc change process shown in FIG. 5 again, after the main controller 12 issues the new disc playback start command to the navigation manager 14 as described above (act 508) and changes the playback status of the loaded DVD disc 1 held by the disc tray 101 to "finished" in the disc management table (act 510), the main controller 12 waits for a disc change request issued from the navigation manager 14 (act 512) or a user disc change request, that is, a request to change the playback-target disc issued by the user via the operating unit 18 (act 514).

If the main controller 12 receives the user disc change request, the main controller 12 issues the playback stop request to the navigation manager 14 (act 516). Then, the main controller 12 acquires the identifier and the title playback history table of the current playback-target DVD disc 1 from the navigation manager 14 (act 518), generates a monitored-title list table for the acquired identifier in the memory 13, and registers the title numbers (TTN) included in the acquired title playback history table into the generated monitored-title list table (act 520). When a monitored-title list table for the acquired identifier is already stored in the memory 13, this monitored-title list table is deleted before generating the new monitored-title list table.

Then, the main controller 12 commands the DVD changer 10 to load the disc tray 101 corresponding to the disc number specified by the user disc change request via the data access controller 11 (act 522). When the loading of the disc tray 101 is completed, the process returns to act 508 and the new disc playback start request is issued to the navigation manager 14, and the above-described process is repeated.

When the disc change request is issued by the navigation manager 14, the main controller 12 acquires the identifier and the monitored-title status table of the current playback-target DVD disc 1 from the navigation manager 14 (act 524), generates a monitored-title list table for the acquired identifier in the memory 13, and registers the title numbers (TTN) included in the acquired monitored-title status table into the generated monitored-title list table (act 526). When a monitored-title list table having the acquired identifier is already stored in the memory 13, this monitored-title list table is deleted before generating the new monitored-title list table.

Next, the main controller 12 refers to the disc management table and determines whether there is any disc number which corresponds to a DVD disc 1 which is stored in the magazine 102 but is not yet played back (act 528). If there is no such disc number, the disc number subsequent to the current disc number is selected from among the disc numbers corresponding to the DVD discs 1 stored in the magazine 102 (act 534). However, if the current disc number is the largest number in the disc numbers corresponding to the DVD discs 1 stored in the magazine 102, the smallest number is selected. Then, all of the playback statuses registered in the disc management table in correspondence with the disc numbers are initialized to "unfinished" (act 536), and a command to load the disc tray 101 corresponding to the selected disc number is issued to the DVD changer 10 via the data access controller 11 (act 532). When the loading of the disc tray 101 is completed, the process returns to act 508 and the new disc playback start request is issued to the navigation manager 14, and the above-described process is repeated.

If there are one or more disc numbers which correspond to DVD discs 1 which are stored in the magazine 102 but are not yet played back, the disc number subsequent to the current disc number is selected from among the disc numbers corresponding to the DVD discs 1 stored in the magazine 102 but are not yet played back (act 530). However, if the current disc number is the largest number in the disc numbers corresponding to the DVD discs 1 stored in the magazine 102 but are not yet played, the smallest number is selected. Then, a command to load the disc tray 101 corresponding to the selected disc number is issued to the DVD changer 10 via the data access controller 11 (act 532). When the loading of the disc tray 101 is completed, the process returns to act 508 and the new disc playback start request is issued to the navigation manager 14, and the above-described process is repeated.

The playback operation of the DVD disc playback apparatus according to a preferred embodiment is performed as described above. In the above-described playback operation, a plurality of DVD discs 1 are played back in a manner shown in, for example, FIG. 8.

Figure 8:
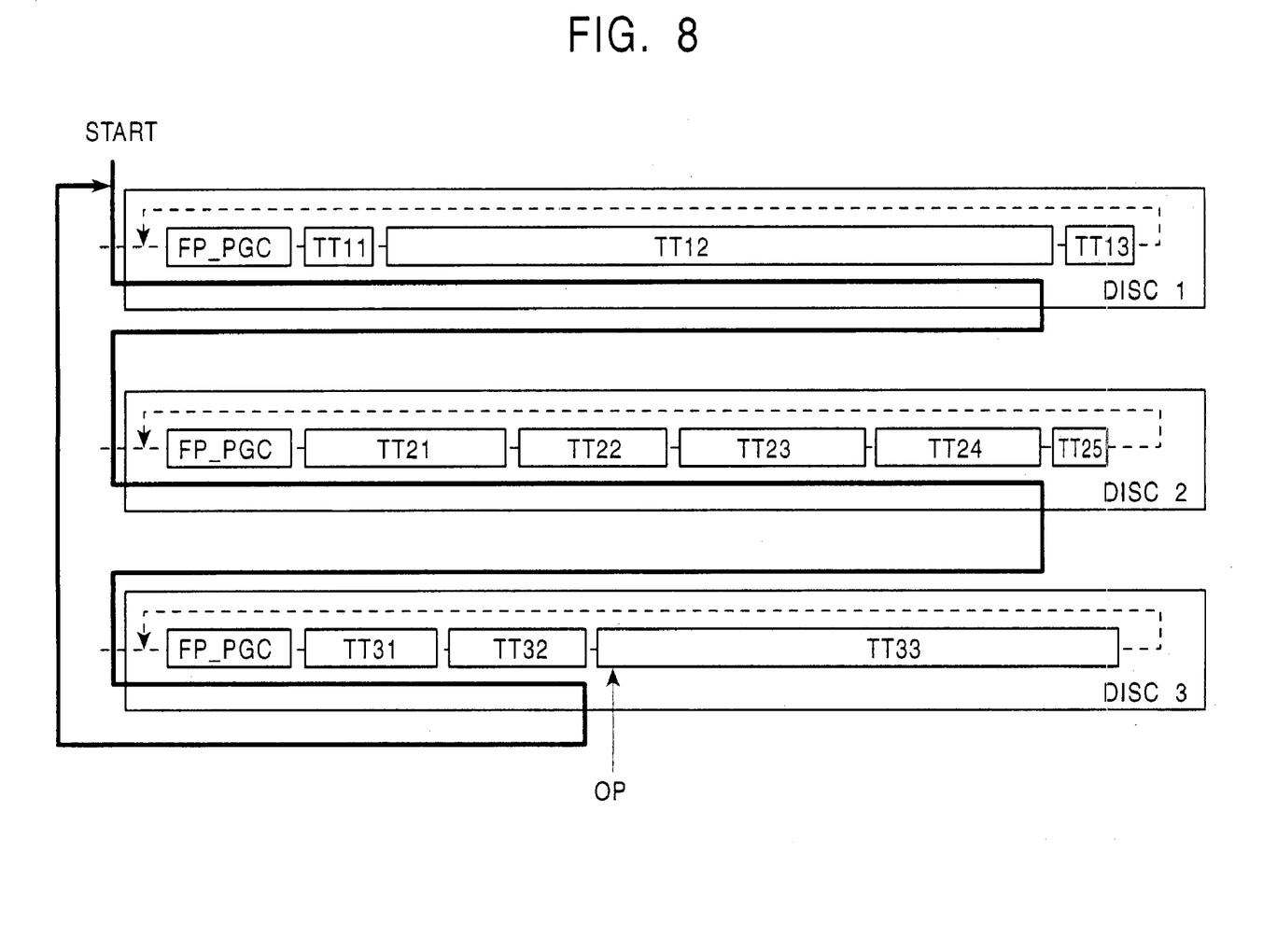
FIG. 8 is a diagram showing an example of an automatic disc change operation performed by the DVD-video playback apparatus according to an embodiment of the present invention.

In the example shown in FIG. 8, three DVD discs 1 (DISC1, DISC2, and DISC3) which corresponding to three disc numbers are stored in the magazine 102. DISC1 includes a title TT12 of a large size, such as a movie, and two titles TT11 and TT13 of a small size, such as movie trailers and commercials, and the navigation data recorded on DISC1 defines that the titles must be played back in the order of TT11, TT12, TT13, . . . , as shown by the dashed lines. In addition, DISC2 includes four titles TT21 to TT24 of a medium size, such as music videos, and a title TT25 of a small size, such as a commercial, and the navigation data recorded on DISC2 defines that the titles must be played back in the order of TT21, TT22, . . . , TT25, . . . , as shown by the dashed lines. In addition, DISC3 includes a title TT33 of a large size, such as a movie, and two titles TT31 and TT32 of a small size, such as movie trailers and commercials, and the navigation data recorded on DISC3 defines that the titles must be played back in the order of TT31, TT32, TT33, . . . , as shown by the dashed lines.

All of DISC1, DISC2, and DISC3 are played back for the first time.

In this case, as shown by the bold lines in the figure, the playback operation in the DVD disc playback apparatus according to the present embodiment is performed as described below. First, the playback of DISC1, which corresponds to the smallest disc number, is started, and the title TT12 of the large size is registered in the monitored-title status table as the monitored title. When the titles TT11 and TT12 are played back in this order and the playback of the title TT12 is completed, it is determined that the playback of the monitored title is completed, and the playback-target disc is changed to DISC2, which corresponds to the subsequent disc number. At this time, the monitored title TT12 is read out from the monitored-title status table and is registered in the monitored-title list table for DISC1.

When the playback of DISC2 is started, the four titles TT21 to TT24, whose sizes are medium and are similar to each other, are registered in the monitored-title status table as the monitored titles. When the titles TT21 to TT24 are played back in this order and the playback of the title TT24 is completed, it is determined that the playback of all of the monitored titles is completed, and the playback-target disc is changed to DISC3, which corresponds to the subsequent disc number. At this time, the monitored titles TT21 to TT24 are read out from the monitored-title status table and are registered in the monitored-title list table for DISC2.

When the playback of DISC3 is started, the title TT33 of the large size is registered in the monitored-title status table as the monitored title. In this case, it is assumed, for example, that a user disc change request to change the playback-target disc to DISC1 is issued when the titles TT31 and TT32 are played back in this order and the playback of the title TT32 is completed. In this case, the playback-target disc is changed to DISC1, which is specified by the user disc change request. At this time, the titles TT31 and TT32 are already played back and are registered in the title playback history table, and these titles which are registered in the history table are registered in the monitored-title list table for DISC3.

Next, the playback of DISC1 is started in accordance with the user disc change request. The playback operation of DISC1 is similar to that described above, and it is determined that the playback of the monitored title is completed when the titles TT11 and TT12 are played back in this order and the playback of the title TT12 is completed. Since there is no DVD disc 1 whose playback status is "unfinished" left in the disc management table the playback statuses registered in the disc management table in correspondence with the disc numbers are initialized to "unfinished", and the playback-target disc is changed to DISC2, which corresponds to the subsequent disc number. At this time, the title included in the monitored-title list table for DISC1 is registered into the monitored-title status table. Accordingly, the size estimation for determining the monitored title is not necessary from the second time the playback operation of DISC1 is performed.

The playback operation of DISC2 is also similar to that described above except that the titles included in the monitored-title list table for DISC2 are registered into the monitored-title status table. Accordingly, it is determined that the playback of the monitored titles is completed when the titles TT21 to TT24 are played back in this order and the playback of the title TT24 is completed, and the playback-target disc is changed to DISC3, which corresponds to the subsequent disc number and whose playback status is "unfinished".

Also in the playback operation of DISC3, the titles included in the monitored-title list table for DISC3 are registered into the monitored-title status table. Accordingly, in this case, the titles TT31 and TT32, which were already played back when the user disc-change request was issued previously, are registered in the monitored-title status table. Therefore, it is determined that the playback of the monitored titles is completed when the titles TT31 and TT32 are played back in this order and the playback of the title TT32 is completed, and the playback-target disc is changed to DISC1, which corresponds to the smallest disc number and whose playback status is "unfinished".

As described above, it is determined that the playback of the DVD disc 1 is completed when the playback of all of the titles whose size is larger than half of the size of the largest title among the titles recorded on the DVD disc 1 is completed, and automatic disc changing is performed for changing the playback-target DVD disc 1. For example, when a single movie is recorded on the DVD disc 1, it can be assumed that the title of interest to the user, that is, the title which the user wishes to view, is the title having the largest size among the titles recorded on the DVD disc 1. In addition, when, for example, a plurality of music clips or short films are recorded on the DVD disc 1, it can be assumed that the titles of interest to the user are a plurality of titles having a size similar to that of the largest title among the titles recorded on the DVD disc 1. Therefore, according to the automatic disc changing of the present embodiment, the titles of interest to the user which are recorded on the DVD disc 1 are reliably played back, and the playback-target DVD disc 1 can be changed when all of the titles of interest are played back.

In addition, according to the present embodiment, when the user issues a disc change request to change the playback-target DVD disc 1 to another DVD disc 1 while the playback-target DVD disc 1 is still being played back, the titles which have been played back before the issuance of the disc change request are memorized, and this DVD disc 1 is automatically changed afterwards when the playback of these titles is completed. If the user issues the disc change request to change the playback-target DVD disc 1 to another DVD disc 1 while the playback-target DVD disc 1 is still being played back, it can be assumed that the playback of the titles of interest to the user is already completed. Therefore, according to the automatic disc changing of the present embodiment, the titles of interest to the user which are recorded on the DVD disc 1 are reliably played back, and the playback-target DVD disc 1 can be changed when all of the titles of interest are played back.

Although the size of each title is estimated on the basis of the sum of the playback times indicated by PGC_PB_TM of the PGCs or the number of cells or programs indicated by PGC_CNT of the PGCs, it may also be estimated by taking into account the sizes of angle blocks and the number of angles, the number of audio streams, and the number of sub-picture streams, etc., included in each title. In addition, when the information regarding the size of each title is recorded on the DVD disc 1, it may also be estimated by using such information.

In addition, although the titles whose size is larger than half of the size of the largest title among the titles recorded on the DVD disc 1 are set as the monitored titles, other criterions may also be used as long as the titles of interest to the user can be selected. For example, all of titles having the size larger than a predetermined size may be set as the monitored titles, or the monitored titles may be selected on the basis of other criterions relating to the size such as dispersion and standard deviation of the title sizes. Furthermore, when the kinds of the titles recorded on the DVD disc 1, such as movies and music albums, can be determined from TXTDT, IT_TXT_IDCD, etc., of VMGI, the monitored titles may also be selected on the basis of the kind of each title.

In addition, in the above-described embodiment, the contents of the monitored-title list table for each DVD disc 1 may also be cleared by a command from the user, or be edited in accordance with titles specified to be monitored by the user.

In addition, in the above-described embodiment, the processes using the monitored-title list table, that is, acts 518, 520, 524, and 526 in FIG. 5 and acts 706, 708, 710, and 724 in FIG. 7 may be omitted.

The above-described embodiment may also be applied to a case in which the DVD-video playback apparatus is provided in a computer system including a DVD-ROM drive which is controlled by a computer program and which has a disc-change function. In addition, the technique of the present embodiment in which the automatic disc changing is performed in accordance with the sizes of the presentations (titles in the descriptions above) and the playback statues of the presentations may also be applied to an arbitrary playback apparatus which stores a plurality of memory mediums, such as recording discs, and selectively plays back presentations stored in one of the memory mediums for automatically changing a playback-target memory medium.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

The invention claimed is:

1. A DVD-video playback apparatus operable to stores a plurality of DVD discs and selectively play back one of the DVD discs, the DVD-video playback apparatus comprising:
   a disc-change unit operable to change a playback-target DVD disc among the plurality of DVD discs;
   a monitored-title setting unit operable to select one or more titles from among titles recorded on the playback-target DVD disc in accordance with the size of each title and sets the selected one or more titles as one or more monitored titles;
   a playback unit operable to play back titles recorded on the playback-target DVD disc in accordance with navigation data recorded on the playback-target DVD disc; and
   a disc-change controller operable to command the playback unit to stop playing back the playback-target DVD disc and the disc-change unit to automatically change the playback-target DVD disc when playback of the one or more monitored titles is completed.

2. The DVD-video playback apparatus of claim 1, wherein the monitored-title setting unit selects the largest title among the titles recorded on the playback-target DVD disc as the monitored title.

3. The DVD-video playback apparatus of claim 1, wherein the monitored-title setting unit selects one or more titles whose sizes are larger than a predetermined size.

4. The DVD-video playback apparatus of claim 1, wherein the monitored-title setting unit selects one or more titles whose sizes are larger than the product of the size of the largest title among the titles recorded on the playback-target DVD disc and a predetermined factor.

5. The DVD-video playback apparatus of claim 1, wherein the monitored-title setting unit selects one or more titles whose sizes are larger than half of the size of the largest title among the titles recorded on the playback-target DVD disc.

6. The DVD-video playback apparatus of claim 1, wherein the monitored-title setting unit estimates the size of each title on the basis of a playback time indicated by a program-chain playback time (PGC_PB_TM) included in video-title-set program-chain information (VTS_PGCI) of the title.

7. The DVD-video playback apparatus of claim 1, wherein the monitored-title setting unit estimates the size of each title on the basis of a playback time indicated by a number of programs or cells indicated by a program-chain content (PGC_CNT) included in video-title-set program-chain information (VTS_PGCI) of the title.

8. A DVD-video playback apparatus operable to stores a plurality of DVD discs and selectively play back one of the DVD discs, the DVD-video playback apparatus comprising:
   a memory operable to store monitor specification information specifying the relationship between identification information of each DVD disc and one or more titles selected from among titles recorded on the DVD disc, that are monitored during playback of the DVD disc;

a disc-change unit operable to change a playback-target DVD disc among the plurality of DVD discs;

a monitored-title setting unit operable to set the one or more titles corresponding to the identification information of the playback-target DVD disc which are specified by the monitor specification information as one or more monitored titles;

a playback unit operable to play back the titles recorded on the playback-target DVD disc in accordance with navigation data recorded on the playback-target DVD disc; and a disc-change controller operable to command the playback unit to stop playing back the playback-target DVD disc and the disc-change unit to automatically change the playback-target DVD disc when playback of the one or more monitored titles is completed.

9. The DVD-video playback apparatus of claim 8, further comprising:

a user request receiving unit which receives a DVD disc change request issued by a user;

a playback history manager operable to manage a playback history of the titles recorded on the playback-target DVD disc from the selection of the corresponding DVD disc as the playback-target DVD disc until a current time; and a monitor-specification-information setting unit operable to update the monitor specification information so that the identification information of the playback-target DVD disc corresponds to one or more titles that have already been played back according to the playback history, wherein, the disc-change controller commands the playback unit to stop playing back the playback-target DVD disc and commands the disc-change unit to change the playback-target DVD disc when playback of the one or more monitored titles is completed or when the user request receiving unit receives the DVD disc change request.

10. A presentation playback apparatus operable to store a plurality of recording discs, each recording disc storing one or more presentations and playback control information for controlling a playback sequence of the one or more presentations, and selectively play back one of the recording discs, the presentation playback apparatus comprising:

a disc-change unit operable to change a playback-target recording disc among the plurality of recording discs;

a monitored presentation setting unit operable to select one or more presentations from among the presentations recorded on the playback-target recording disc in accordance with the size of each presentation and set the selected one or more presentations as one or more monitored presentations;

a playback unit operable to play back the presentations recorded on the playback-target recording disc in accordance with the playback control information recorded on the playback-target recording disc; and a disc-change controller operable to command the playback unit to stop playing back the playback-target recording disc and the disc-change unit to automatically change the playback-target recording disc when playback of the one or more monitored presentations is completed;

wherein the recording discs include recording discs in which a presentation to be played back last is not defined.

11. A presentation playback apparatus operable to store a plurality of recording discs, each recording disc storing one or more presentations and playback control information for controlling a playback sequence of the one or more presentations, and play back one of the recording discs, the presentation playback apparatus comprising:

a memory operable to store monitor specification information specifying the relationship between identification information of each recording disc and one or more presentations selected from among the presentations recorded on the recording disc, the selected one or more presentations being monitored during playback of the recording disc;

a disc-change unit operable to change a playback-target recording disc among the plurality of recording discs;

a playback unit operable to play back the presentations recorded on the playback-target recording disc in accordance with the playback control information recorded on the playback-target recording disc;

a user request receiving unit operable to receive a recording disc change request issued by a user;

a playback history manager operable to manage a playback history of presentations recorded on the playback-target recording disc from the selection of the corresponding recording disc as the playback-target recording disc until the current time;

a monitor-specification-information setting unit operable to update the monitor specification information so that the identification information of the playback-target recording disc corresponds to one or more presentations which have already been played back according to the playback history;

a monitored presentation setting unit operable to set the one or more presentations corresponding to the identification information of the playback-target recording disc which are specified by the monitor specification information as one or more monitored presentations; and a disc-change controller operable to command the playback unit to stop playing back the playback-target recording disc and the disc-change unit to automatically change the playback-target recording disc when playback of the one or more monitored presentations is completed or when the user request receiving unit receives the recording disc change request.

12. An automatic disc change control method used in a DVD disc playback apparatus operable to store a plurality of DVD discs and selectively plays back one of the DVD discs for controlling an operation of changing a playback-target DVD disc among the plurality of DVD discs, the automatic disc change control method comprising the acts of:

selecting one or more titles selected from among titles recorded on the playback-target DVD disc in accordance with the size of each title;

setting the selected one or more titles as one or more monitored titles;

playing back the titles recorded on the playback-target DVD disc in accordance with navigation data recorded on the playback-target DVD disc; and stopping playback of the playback-target DVD disc and changing the playback-target DVD disc when playback of the one or more monitored titles is completed.

13. The automatic disc change control method according to claim 12, wherein the largest title among the titles recorded on the playback-target DVD disc is selected as the monitored title.

14. The automatic disc change control method of claim 12, wherein one or more titles whose sizes are larger than a predetermined size are selected as the one or more monitored titles.

15. The automatic disc change control method of claim 12, wherein one or more titles whose sizes are larger than the product of the size of the largest title among the titles recorded on the playback-target DVD disc and a predetermined factor are selected as the one or more monitored titles.

16. The automatic disc change control method of claim 12, wherein one or more titles whose sizes are larger than half of the size of the largest title among the titles recorded on the playback-target DVD disc are selected as the one or more monitored titles.

17. The automatic disc change control method of claim 12, wherein the size of each title is estimated on the basis of a playback time indicated by a program-chain playback time (PGC_PB_TM) included in video-title-set program-chain information (VTS_PGCI) of the corresponding title or the number of programs or cells indicated by a program-chain content (PGC_CNT) included in video-title-set program-chain information (VTS_PGCI) of the corresponding title.

18. An automatic disc change method for controlling an operation of changing a playback DVD disc among a plurality of DVD discs, said method comprising the acts of:
providing a disc identifier and a monitor status table;
generating a monitored title list table for the disc identity and register title numbers in the monitored title status table;
playing back a title recorded on the playback DVD disc;
updating playback status in the monitored status table;
stopping disc playback; selecting a new playback DVD disc from said plurality of DVD discs; and automatically changing from the playback DVD disc to the new playback DVD disc.

19. The automatic disc change method of claim 18, wherein said monitored title list table includes one or more titles that are larger in size than a predetermined size.

20. The automatic disc change method of claim 18, wherein said monitored title list table comprises titles that are larger in size than the product of largest title on the playback.

21. The automatic disc change method of claim 20, wherein the multiplier factor is 0.5.

* * * * *